Sept. 2, 1952  M. W. LOWE  2,609,022
APPARATUS FOR PEELING TOMATOES
Filed Oct. 6, 1944  4 Sheets-Sheet 1

INVENTOR.
MARK W. LOWE,
BY
ATTORNEYS.

Sept. 2, 1952 M. W. LOWE 2,609,022
APPARATUS FOR PEELING TOMATOES
Filed Oct. 6, 1944 4 Sheets-Sheet 2
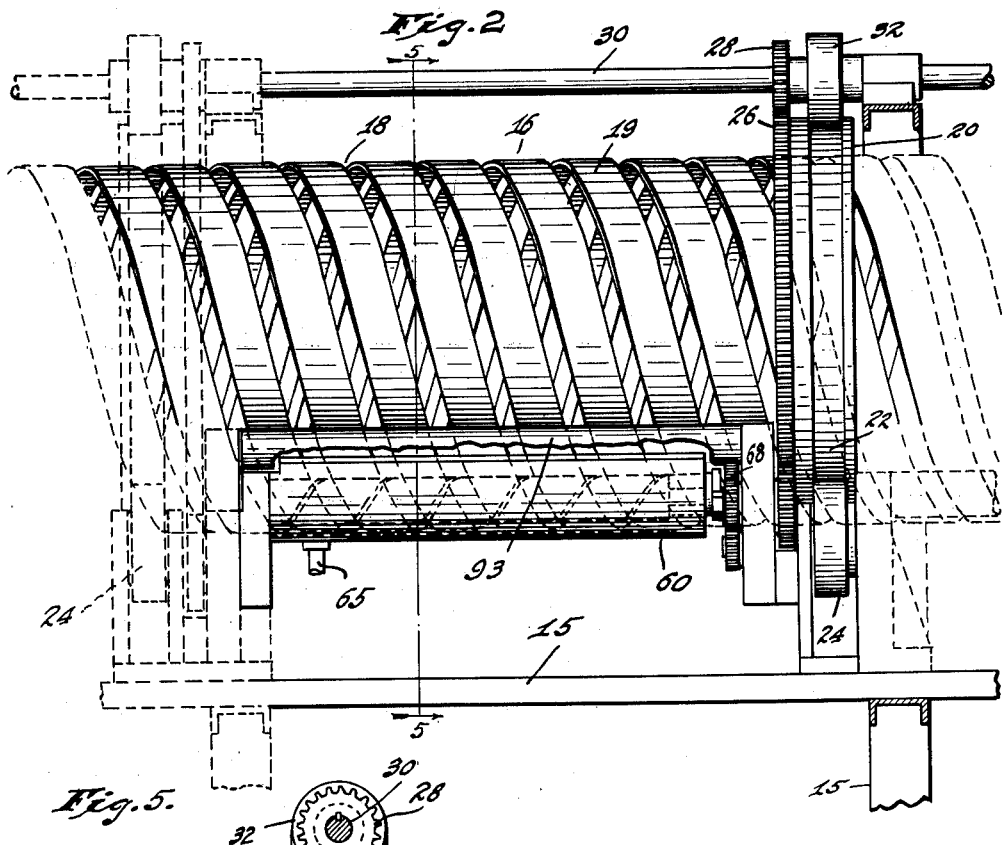
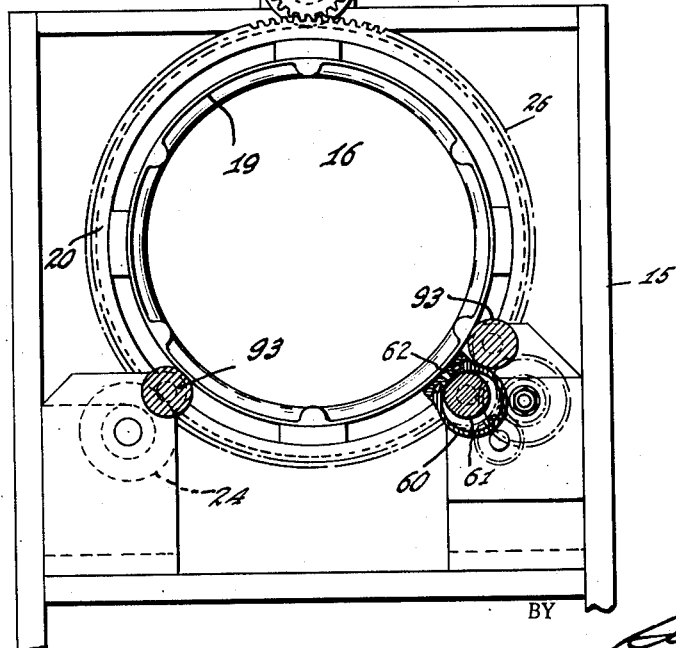
INVENTOR.
MARK W. LOWE,
BY
ATTORNEYS.

Sept. 2, 1952          M. W. LOWE          2,609,022
APPARATUS FOR PEELING TOMATOES
Filed Oct. 6, 1944          4 Sheets-Sheet 3
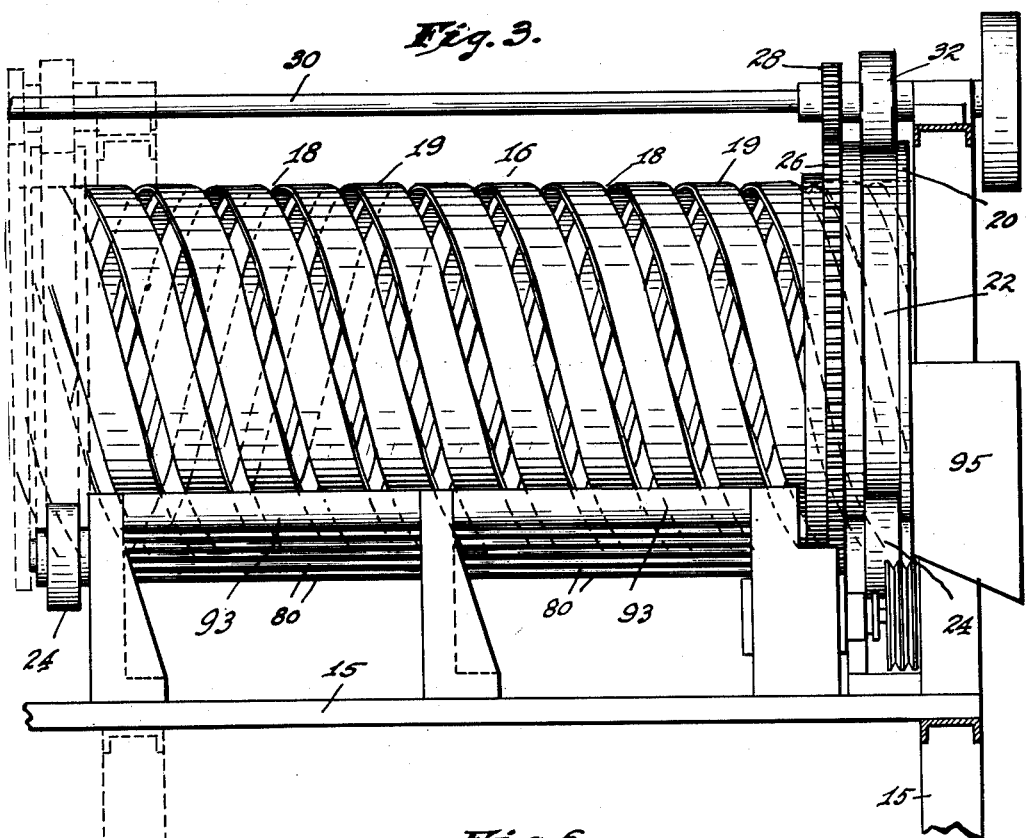
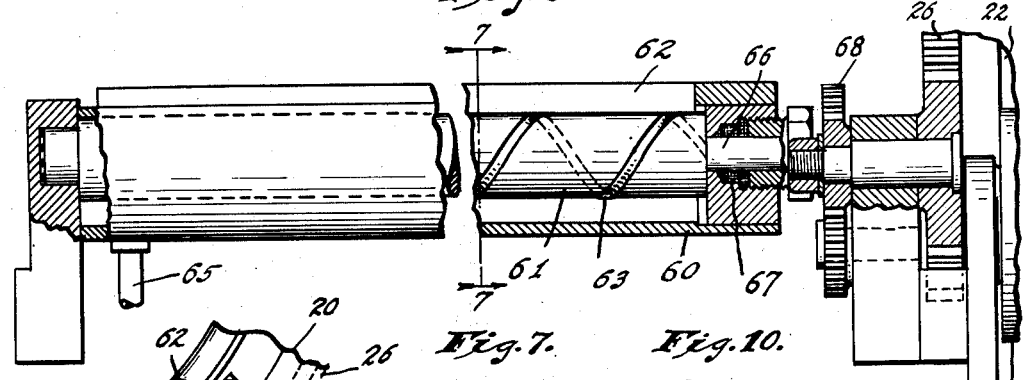
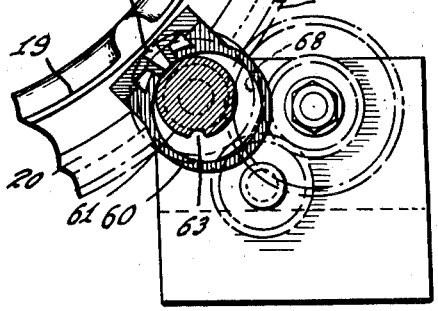
INVENTOR.
MARK W. LOWE,
BY
ATTORNEYS.

Sept. 2, 1952 — M. W. LOWE — 2,609,022
APPARATUS FOR PEELING TOMATOES
Filed Oct. 6, 1944 — 4 Sheets-Sheet 4
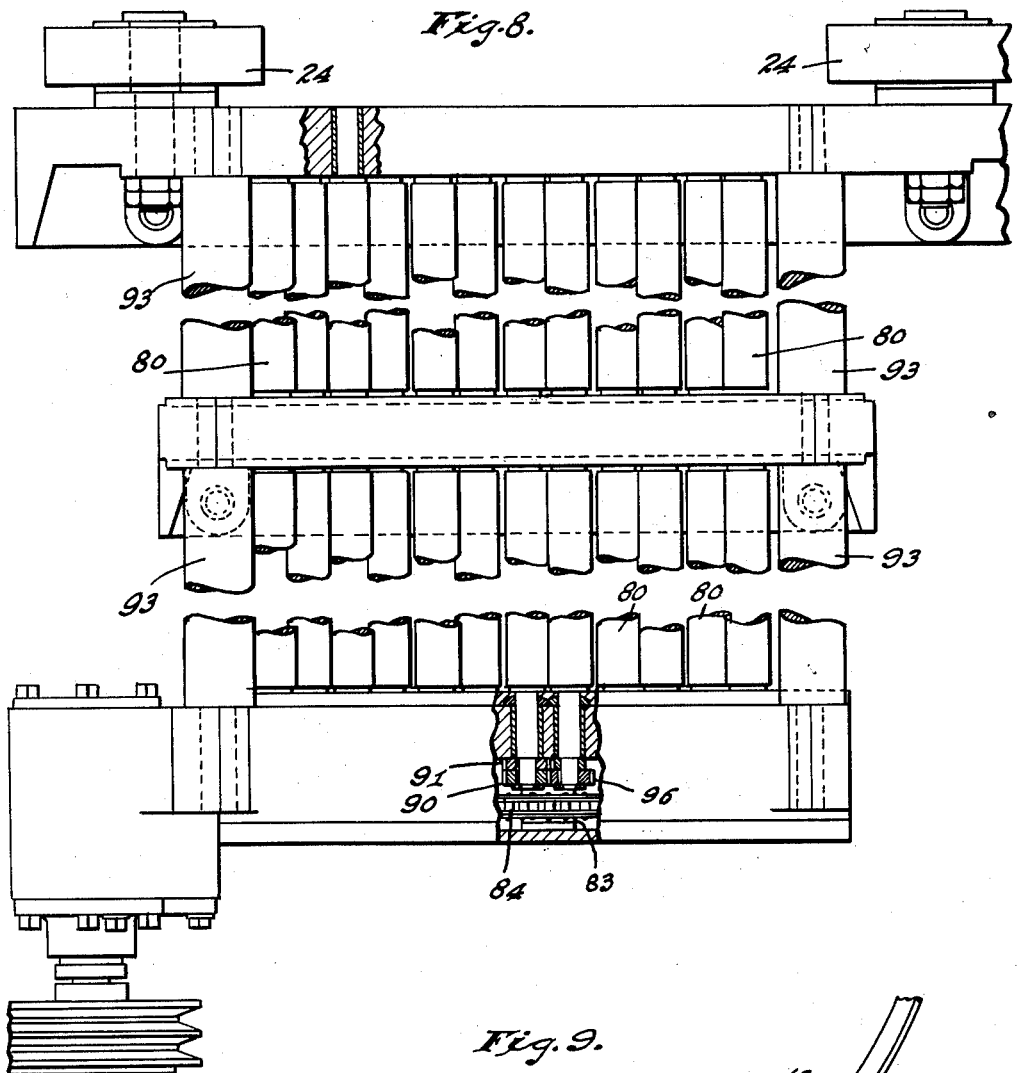
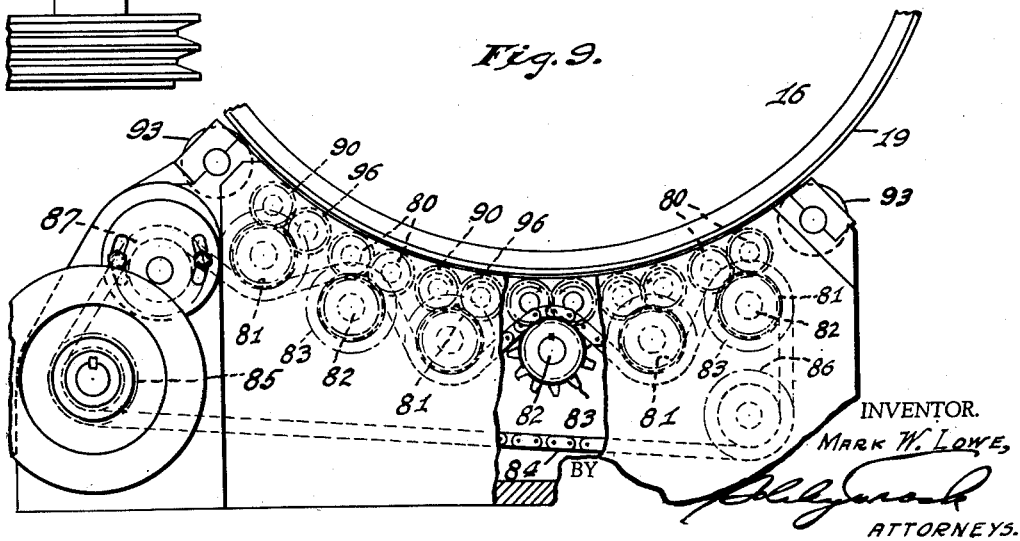
INVENTOR.
MARK W. LOWE,
BY
ATTORNEYS.

Patented Sept. 2, 1952

2,609,022

UNITED STATES PATENT OFFICE 2,609,022

APPARATUS FOR PEELING TOMATOES

Mark W. Lowe, Connersville, Ind.

Application October 6, 1944, Serial No. 557,410

9 Claims. (Cl. 146—49)

My invention relates to a machine for scalding, peeling, and breaking the skins of fruits and vegetables and more particularly to a machine for peeling tomatoes. It is the primary object of my invention to produce a machine which will operate effectively to remove the skins of tomatoes and place them in suitable condition for canning. A further object of my invention is to remove the skins of tomatoes with a minimum amount of damage to the tomatoes themselves. Still another object of my invention is to produce a machine in which tomatoes or other fruits and vegetables may be effectively tumbled while being subjected to scalding or to other operations.

In carrying out my invention in the preferred form, I construct the machine in three sections through which tomatoes are successively conveyed in a drum. Such drum is provided with generally circumferential slots through which the tomatoes are exposed to the action of various means located outside the drum. In the first section of the machine I provide a scarifying means which acts through such slots to break the skins of the tomatoes. In the second section of the machine, the tomatoes are scalded, desirably by jets of steam or hot water directed inwardly of the drum through the slots previously referred to. In the third section of the machine the skins of the tomatoes, loosened by the scarifying, scalding, and tumbling to which the tomatoes are subjected during their passage through the drum, are removed by peeling rollers which are located outside the drum and which grip and strip from the tomatoes skins projecting through the aforesaid slots.

Figure 1:
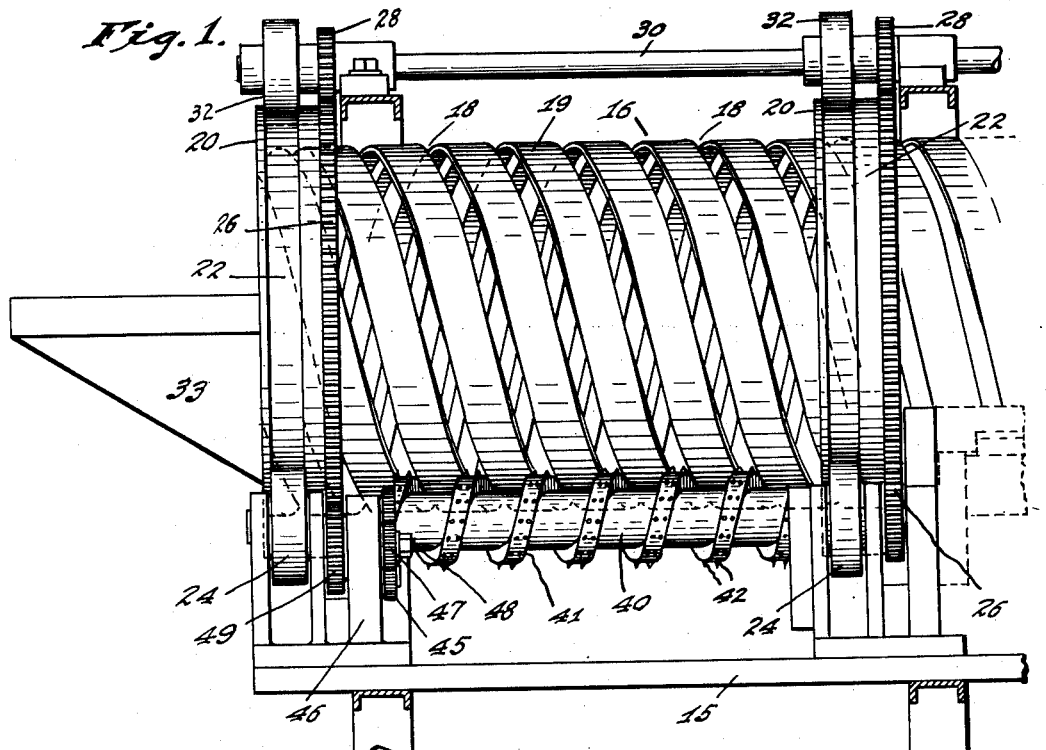
Figure 4:
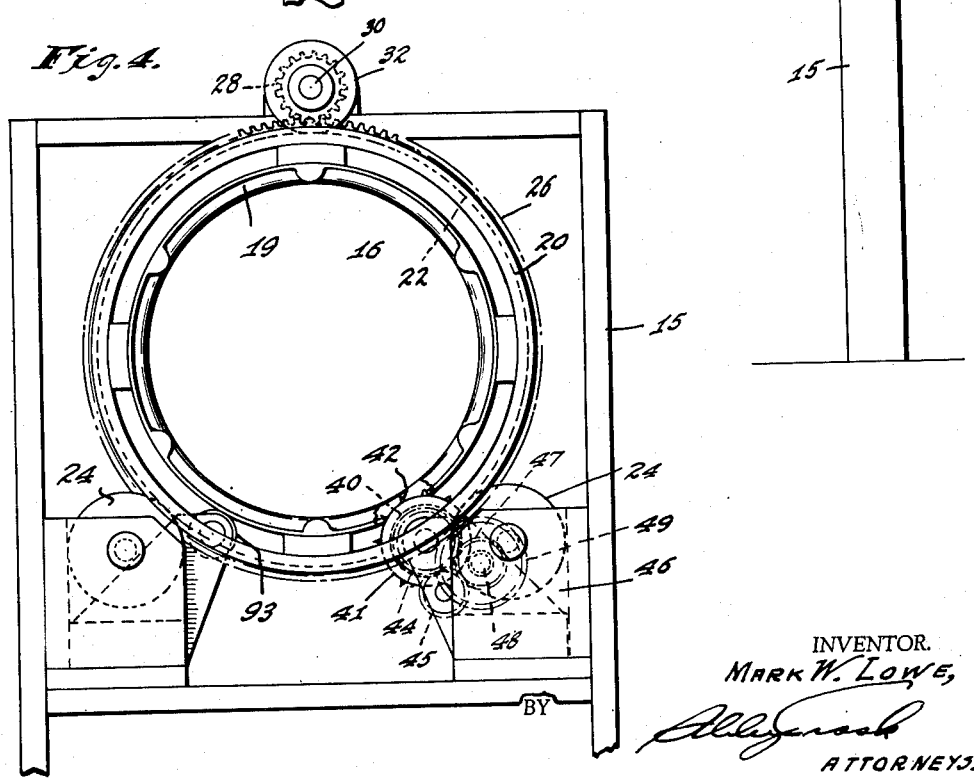

The accompanying drawings illustrate my invention: Figs. 1, 2, and 3 are side elevations respectively of the three sections of a complete tomato-peeling machine; Fig. 4 is an elevation of the receiving end of the machine with the supply chute removed; Fig. 5 is a transverse vertical section on the line 5—5 of Fig. 2; Fig. 6 is a fragmental side elevation of the scalding means on an enlarged scale; Fig. 7 is a transverse vertical section on the line 7—7 of Fig. 6; Fig. 8 is a plan view of the peeling mechanism; Fig. 9 is a rear end elevation of the peeling mechanism; and Fig. 10 is a fragmental axial section on an enlarged scale showing a preferred construction of the drum and the manner in which it is associated with the peeling rollers.

The machine shown in the drawing comprises a frame 15 which rotatably supports a drum designated in its entirety by the reference numeral 16. Such drum is provided interiorly with one or more helical ribs, adapted to cause tomatoes to be fed axially through the drum as it is rotated, and with generally circumferentially extending slots through which the tomatoes are exposed to the action of various means located outside the drum. Preferably, the drum 16 is formed, as more fully shown and described in my prior Patent No. 2,332,093, of a plurality of helically coiled rods 17 (Fig. 10) covered by strips 19 of rubber or similar elastic material each formed centrally to embrace a rod 17 and extending toward the strips of adjacent rods to leave helical slots 18. As shown, the drum comprises four of the rods 17 and strips 19, but this number may be varied as desired.

At intervals along its length, the drum 16 is provided exteriorly with supporting rings 20 to each of which the rods 17 are secured. Each ring 20 is formed exteriorly with an annular groove 22 adapted to receive supporting rollers 24 rotatably mounted on the frame 15.

For the purpose of driving the drum, the rings 20 respectively carry ring gears 26, each of which meshes with a pinion 28 rigidly mounted on a shaft 30 which extends longitudinally of the frame 15 and which is adapted to be driven by any suitable means. In addition to the pinions 28 meshing with the gears 26, the shaft 30 may be provided with rolls 32 received in the grooves 22 of the respective rings 20. The rolls 32 are loosely mounted on the shaft 30 so that they may rotate relatively thereto.

As the drum rotates, in a counter-clockwise direction (Figs. 4, 5, and 7), tomatoes supplied to the inlet end through a supply chute 33 will be fed axially through the drum by the action of the helical ribs on the strips 19. Rotation of the drum causes the tomatoes to be carried upwardly for a distance from the lowest point of the drum, and the tomatoes then slide or roll downwardly. This movement, augmented by the action of the scarifying and other external means hereinafter described, produces a tumbling action by which substantially all portions of the surface of each tomato will be presented toward the slots 18.

In the first section of the machine, in which the tomatoes are scarified to break their skins, I mount in association with the lower portion of the drum a shaft 40 which extends longitudinally of the frame 15 and is rotatably supported therefrom. The shaft 40 is desirably located slightly below the highest point attained by the tomatoes in the rotation of the drum. The shaft 40 carries means adapted to project through the slots 18 and engage the tomatoes within the drum 16. As shown, such means comprises a helical rib 41 integral with the shaft 40 and provided on its outer surface with a multiplicity of relatively sharp projections 42. The rib 41 is of opposite hand to the strips 19, so that by rotating the shaft 40 at the proper speed and in a direction opposite to that in which the drum rotates the rib 41 will not interfere with drum-rotation. In the particular construction shown, there are four of the strips 19 in the drum 16 and one rib 41 on the shaft 40 and the pitch of the rib is one-fourth that of each of the strips 19. In order that the pitch-angle of the rib may approximate that of the slots 18, the outer diameter of the shaft 40 is one-fourth that of the drum; and in order that the rib may remain in the slots 18 as the drum rotates, the shaft 40 is driven at a rotational speed four times that of the drum.

For the purpose of driving the shaft 40, it is provided with a drive gear 44 which meshes with an idler pinion 45 rotatably supported from a bracket 46 mounted on the main frame 15. The idler pinion 45 meshes with a gear 47 rigidly mounted on a shaft 48 which is rotatably supported in the bracket 46. The shaft 48 carries a gear 49 meshing with one of the ring gears 26 on the drum 16.

As the tomatoes pass through the machine they are carried upwardly by rotation of the drum and come into contact with the rib 41 and the teeth 42 carried thereby. The teeth break the skins of the tomatoes, and in addition tend to lift them clear of the strips 19. This lifting action of the teeth promotes a tumbling of the tomatoes and tends to prevent each tomato from sliding on the inner surface of the strips 19 with the same portion of its surface always presented toward the slot 18.

After having been subjected to the action of the teeth 42 on the shaft 40, the tomatoes continue their passage through the drum and come into contact with jets of steam or hot water. Conveniently, these jets are provided by the means illustrated in Figs. 2, 5, 6, and 7. As shown in those figures, there is disposed at one side of the drum 16 a longitudinally extending casing 60 enclosing a shaft 61 and provided on that side closest to the drum 16 with a longitudinally extending slot 62. The shaft 61 is mounted eccentrically in the casing 60 so that its outer surface overlies the inner end of the slot 62. In the outer surface of the shaft 61, I provide a helical groove 63 of a pitch corresponding to the spacing of adjacent turns of the strips 19. The interior of the casing 60 is connected, as through a conduit 65, with a source of steam under pressure.

Steam supplied to the casing 60 through the conduit 65 may escape therefrom at the points where the helical groove 63 crosses the slot 62, the steam entering the slot 62 by traveling in both directions toward it through the groove 63. By proper spacing of the turns of the helical groove 63, and by rotating the shaft 61 in the proper direction and at the proper speed, there are provided a plurality of steam jets, each discharging from the slot 62 into a slot 18 and moving along the slot 62 at a speed which maintains it opposite the associated slot 18.

For the purpose of rotating the shaft 61, it may be provided with a reduced journal 66 which extends outwardly through a stuffing box 67 in an end wall of the casing 60 and which, beyond such end wall, has a gear 68 secured to it. The gear 68 is driven through an appropriate train of gearing from one of the ring gears 26 on the drum 16. As shown, the gear train is similar to that employed to rotate the shaft 40 previously described.

In the device of the drawings there is a single groove 63 in the shaft 61, the pitch of this groove corresponding to the spacing of adjacent strips 19 in the drum 16. As there are four of the strips 19 in the drum, the shaft 61 therefore rotates at four times the speed of the drum 16. Although not essential, I prefer to make the groove 63 of opposite hand to the strips 19, and the shaft 61 therefore rotates in a direction opposite to that of the drum 16. The gear train previously referred to is designed to rotate the shaft 61 at the proper speed and in the proper direction.

As the tomatoes pass through that portion of the drum 16 coextensive with the shaft 61, jets of steam enter the slots 18 and strike the tomatoes whose surfaces are exposed through those slots. The action of such steam on the tomatoes, the skins of which have previously been broken by the action of the teeth 42, tends to shrink the skins and causes them to split. In addition, if the slot 62 is located near the highest point attained by the tomatoes in the rotation of the drum 16, as it is in the machine of the drawings, the steam jets acting on the tomatoes will appreciably augment the tumbling action. Further, the impact of the steam jets on the loosened skins will tend to peel them from the body of the tomatoes.

It is not necessary that the fluid supplied to the casing 60 be steam, as hot water will also be effective. In assisting the tumbling action and tending to tear the skins from the tomatoes, the action of the jets emitted from the slot 62 is independent of the temperature of the fluid; but I prefer to use fluid of elevated temperature because of its effect in facilitating removal of the skins.

After having been subjected to the action of the steam jets, the tomatoes pass into association with peeling mechanism designed to effect complete removal of the skins. The peeling mechanism which I prefer to employ is that illustrated in Figs. 3, 8, and 9. It comprises pairs of peeling rollers 80 rotatably supported from and extending longitudinally of the frame 15. As will be clear from Fig. 9, the pairs of rollers 80 are arranged, transversely of the machine, on an arc substantially concentric with the axis of the drum 16 and as close as conveniently possible to the exterior surface of such drum.

For its working length, each of the rolls 80 is faced with rubber or similar elastic material, and the rolls of each pair are spaced apart a distance such that this rubber facing is compressed. The two rolls of each pair are driven in opposite directions so that the interengaging portions of their faces move generally downwardly, or away from the drum 16. As the tomatoes pass through the drum opposite the rollers 80, their loosened skins drop through the slots 18 to become pinched between the two rolls 80 of each pair and thereby pulled downwardly away from the tomatoes.

For the purpose of driving each pair of rollers 80, I provide a drive gear 81. The several drive gears 81 are desirably driven by a common driving means, here shown as of the chain-and-sprocket variety. As will be clear from from Fig. 9, each of the drive gears is rotatable with a shaft 82 to which a sprocket 83 is fixed, and a drive chain 84 is associated in common with all sprockets 83. In order to secure an adequate arc of contact on each sprocket 84, the chain is desirably arranged as shown in Fig. 9, passing between and engaging opposite sides of adjacent sprockets. In addition to engaging the sprockets 83 the chain 84 also engages a drive sprocket 85 and two idlers 86 and 87. One of the idlers, here shown as the idler 87, is adjustable to tighten the chain. The sprocket 85 may be driven in any convenient manner.

The two rollers 80 of each pair are drivingly interconnected by pinions 90 of equal diameter and one of them is provided with a pinion 91 engaging the associated drive gear 81. The roll bearing the pinion 91 is so selected as to impart to each roll rotation in the desired direction above described.

In order to avoid the necessity for longitudinally extending stiffening members supporting the strips 19 between the rings 20, which stiffening members would partially occlude the slots 18, I provide between the rings 20 supporting rollers 93. Such rollers are mounted in the frame 15 on opposite sides of the drum and support the weight of the strips 19 and of the tomatoes within the drum. In the first section of the machine, the necessity for a roll 93 on one side of the drum may be eliminated by making the shaft 40 of a diameter such that it will support the strips 19.

In the operation of the machine, tomatoes are supplied to the drum 16 through the chute 33, and pass axially through the drum as it is rotated in a counter-clockwise direction (Figs. 4, 5, and 7). In the first section of the machine the skins of the tomatoes are broken by the scarifying teeth 42; in the second section, the steam jets issuing from the slot 62 through the drum-slots 18 loosen the skins and partially separate them from the bodies of the tomatoes; and in the third section, the loosened skins hanging through the slots 18 are pinched between oppositely rotating rolls 80 and stripped from the tomatoes. Emerging from the rear end of the drum 16, the tomatoes are conveyed away through a discharge chute 95.

Jets of steam and hot-water sprays have previously been used to loosen the skins of tomatoes preparatory to peeling them, but I have found that the peeling operation is made even easier if the skins of the tomatoes are broken before the scalding operation. With the skins broken before scalding, the scalding operation seems to enlarge breaks in the skin and the skin tends to peel back away from the breaks in it.

The tumbling action to which the tomatoes are subjected by rotation of the drum 16 also aids in loosening the skins. Tumbling, however is very hard to obtain, as the tomatoes are not spherical and slide readily on the inner surfaces of the strips 19. The rib 41 and teeth, as well as the jets of steam issuing from the slot 62, act upwardly on the lower surfaces of the tomatoes and tend to lift the tomatoes upwardly clear of the strips 19, thus promoting the desired tumbling action.

As will be obvious from Fig. 10, although the tomatoes have a diameter materially greater than the width of the slots 18, they nevertheless protrude through such slots. Accordingly, it is not essential that the scarifying means mounted exteriorly of the drum extend into the interior of the drum through the slots 18, as such scarifying means could be located entirely outside the drum and arranged to act only on those portions of the tomatoes which protrude through the slots. In such event, it would still be desirable to confine the actual scarifying elements 42 or their equivalent to regions opposite the slots 18 in order to avoid interference between such elements and the strips 19.

It will be understood that the points 42 or other scarifying means employed in the practice of my invention cut through the skins of the fruit being treated along more or less definite lines. In this specification and the appended claims, therefore, the term "scarifying" is employed to designate a pointed or edged element which cuts along a more or less well defined line and to distinguish such a skin-breaking element from a fruit-rubbing means which disintegrates the skin of the fruit by an abrading action performed over extended areas.

It was noted above that the strips 19, between the rings 20, receive support from rollers 93 and preferably also from the surface of the shaft 40. In such an arrangement, each strip 19 progressively contacts a helical band on the surface of the shaft 40. Obviously, in order to avoid interference with the strips 19, the rib 41 and/or scarifying elements carried by the shaft must be confined to the helical region of the shaft surface lying between successive turns of the aforesaid helical band. The gears 26 and 28 provide a positive interconnection between the drum 16 and shaft 40 thus maintaining a definite relationship between the angular positions of the drum and shaft about their respective axes and insuring that the rib 40 and/or the scarifying elements 42 will always be properly aligned with the slots 18 in the drum.

I claim as my invention:

1. In a machine of the type described, a frame, a hollow drum rotatably mounted in said frame, said drum being provided with a helical slot in its wall, a shaft supported from said frame contiguous to said drum and on an axis parallel to that of said drum, a helical rib on said shaft, said rib having a pitch angle equal and opposite to that of said slot and projecting through said slot into the interior of said drum, scarifying means carried by said rib in position to engage material within the drum, and means for rotating said drum and shaft in opposite directions and in timed relation.

2. In a machine of the type described, a frame, a hollow drum rotatably mounted in said frame, said drum being provided with a helical slot in its wall, a shaft supported from said frame contiguous to said drum and on an axis parallel to that of said drum, scarifying means arranged in a helix on said shaft and extending through said slot into said drum in position to engage material therein, the pitch angle of said helix being equal to and opposite to that of said slot, and means for rotating said drum and shaft in opposite directions and in timed relation.

3. In a machine of the type described, a frame, a hollow drum rotatably mounted in said frame, said drum being provided with a helical slot in its wall, a shaft supported from said frame contiguous to said drum and on an axis parallel to that of said drum, projections arranged in a helix on said shaft and extending through said slot into said drum in position to engage material therein, the pitch angle of said helix being equal to and opposite to that of said slot, and means for rotating said drum and shaft in opposite directions and in timed relation.

4. In a machine of the type described, a frame, a hollow drum rotatably mounted in said frame, said drum being provided with a helical slot in its wall, a shaft supported from said frame contiguous to said drum and on an axis parallel to that of said drum, a helical rib on said shaft, said rib having a pitch angle equal and opposite to that of said slot and projecting through said slot into the interior of said drum in position to engage material therein, and means for rotating said drum and shaft in opposite directions and in timed relation.

5. In a machine of the type described, a frame, a hollow drum rotatably mounted in said frame, said drum being provided with a helical slot in its wall, a shaft supported from said frame exteriorly of said drum but contiguous thereto, scarifying means arranged in a helix on said shaft and extending through said slot into said drum to engage material therein, and means for rotating said drum and shaft in such relative directions and in such timed relation as to maintain the scarifying means within the slot.

6. In a machine of the type described, a frame, a hollow drum rotatably mounted in said frame, said drum being provided with a helical slot extending through its wall, a shaft supported in fixed axial position from said frame exteriorly of said drum but adjacent thereto, the width of said slot being less than the diameter of fruit to be peeled, scarifying elements carried by said shaft for scarifying the skins of fruit contained in said drum and exposed by said slot, said scarifying elements being confined to a region which extends helically of the shaft and which has a width no greater than the width of said slot and means providing a positive interconnection between said drum and shaft for rotating them at a relative speed so co-ordinated with the pitch angles of the slot and said helical region that each scarifying element, at its point of closest approach to the drum-axis, will be disposed between the sides of the slot.

7. In a machine of the type described, a frame, a hollow drum rotatably mounted in said frame, said drum being provided with a helical slot extending through its wall, a shaft supported in fixed axial position from said frame exteriorly of said drum but adjacent thereto, the width of said slot being less than the diameter of fruit to be peeled, projections carried by said shaft for engagement with fruit contained in said drum and exposed by said slot, said projections being confined to a region which extends helically of the shaft and which has a width no greater than the width of said slot, and means providing a positive interconnection between said drum and shaft for rotating them at a relative speed so co-ordinated with the pitch angles of said slot and said helical region that each projection, at its point of closest approach to the drum-axis, will be disposed between the sides of the slot.

8. In a machine of the type described, a frame, a hollow drum rotatably mounted in said frame, said drum being provided with a helical slot extending through its wall, a shaft supported in fixed axial position from said frame exteriorly of said drum but adjacent thereto, the width of said slot being less than the diameter of fruit to be peeled, said shaft being provided with a helical rib projecting into said slot for engagement with fruit within the drum, said rib having a width no greater than the width of the slot and a pitch angle equal to that of the slot, and means providing a positive interconnection between said drum and shaft for rotating them at such relative speeds that said rib is maintained within the slot.

9. In a machine of the type described, a frame, a hollow, helically slotted drum rotatably mounted in said frame on a generally horizontal axis, a shaft rotatably mounted in fixed axial position in said frame on an axis parallel to and below the drum axis, said shaft engaging and supporting said drum, means for jointly rotating said shaft and drum in opposite directions, said means including a positive interconnection between the shaft and drum and operating to drive them at relative speeds so co-ordinated with the pitch-angle of the slot in the drum that a helical band of equal pitch-angle on the shaft will always remain opposite the drum-slot and never be engaged by portions of the drum-surface lying between slot-turns, and means mounted on said shaft within the confines of said helical band for engaging fruit within the drum and exposed by the slot.

MARK W. LOWE.

REFERENCES CITED

The following references are of record in the file of this patent:

UNITED STATES PATENTS

| Number | Name | Date |
|---|---|---|
| 482,283 | Thomas | Sept. 6, 1892 |
| 722,840 | Hammer | Mar. 17, 1903 |
| 995,545 | Marrone | June 20, 1911 |
| 1,062,935 | Trust | May 27, 1913 |
| 1,104,175 | Dunkley | July 21, 1914 |
| 1,217,269 | Burdick | Feb. 27, 1917 |
| 1,252,322 | Cooley | Jan. 1, 1918 |
| 1,381,347 | Schaller | June 14, 1921 |
| 1,441,161 | McCabe | Jan. 2, 1923 |
| 1,448,532 | Harding | Mar. 13, 1923 |
| 1,466,799 | Miller | Sept. 4, 1923 |
| 1,581,071 | Lowe | Apr. 13, 1926 |
| 1,753,902 | Nevills | Apr. 8, 1930 |
| 1,992,995 | Denner et al. | Mar. 5, 1935 |
| 2,146,267 | Perez | Feb. 7, 1939 |
| 2,178,007 | Thompson | Oct. 31, 1939 |
| 2,287,014 | Allan | June 23, 1942 |
| 2,332,093 | Lowe | Oct. 19, 1943 |
| 2,416,837 | Meyer | Mar. 4, 1947 |

FOREIGN PATENTS

| Number | Country | Date |
|---|---|---|
| 631,894 | France | Dec. 19, 1929 |
| | (2d addition to No. 35,921) | |